UNITED STATES PATENT OFFICE.

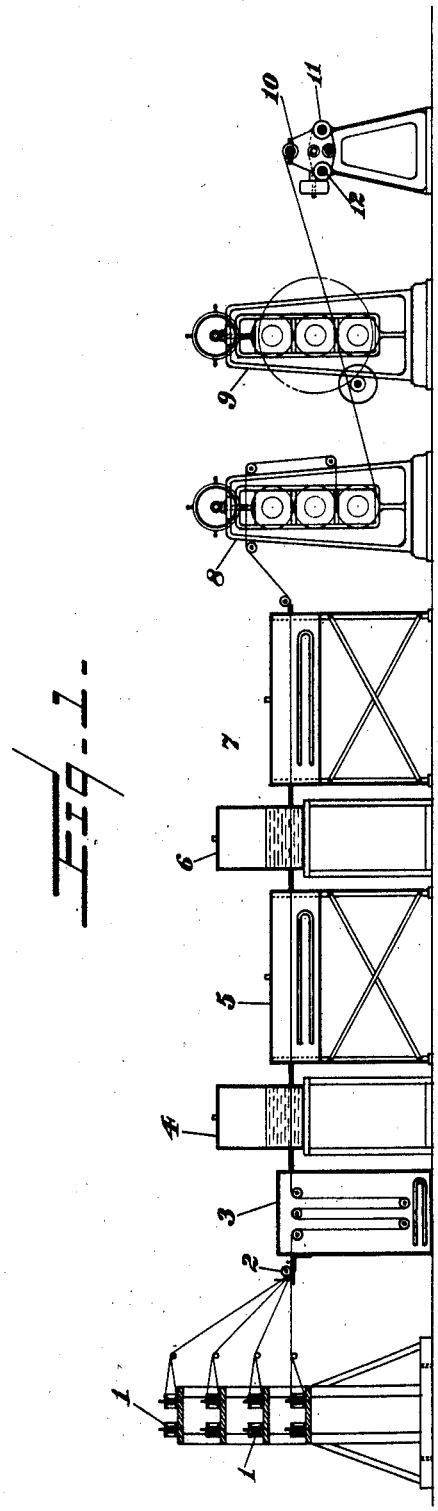

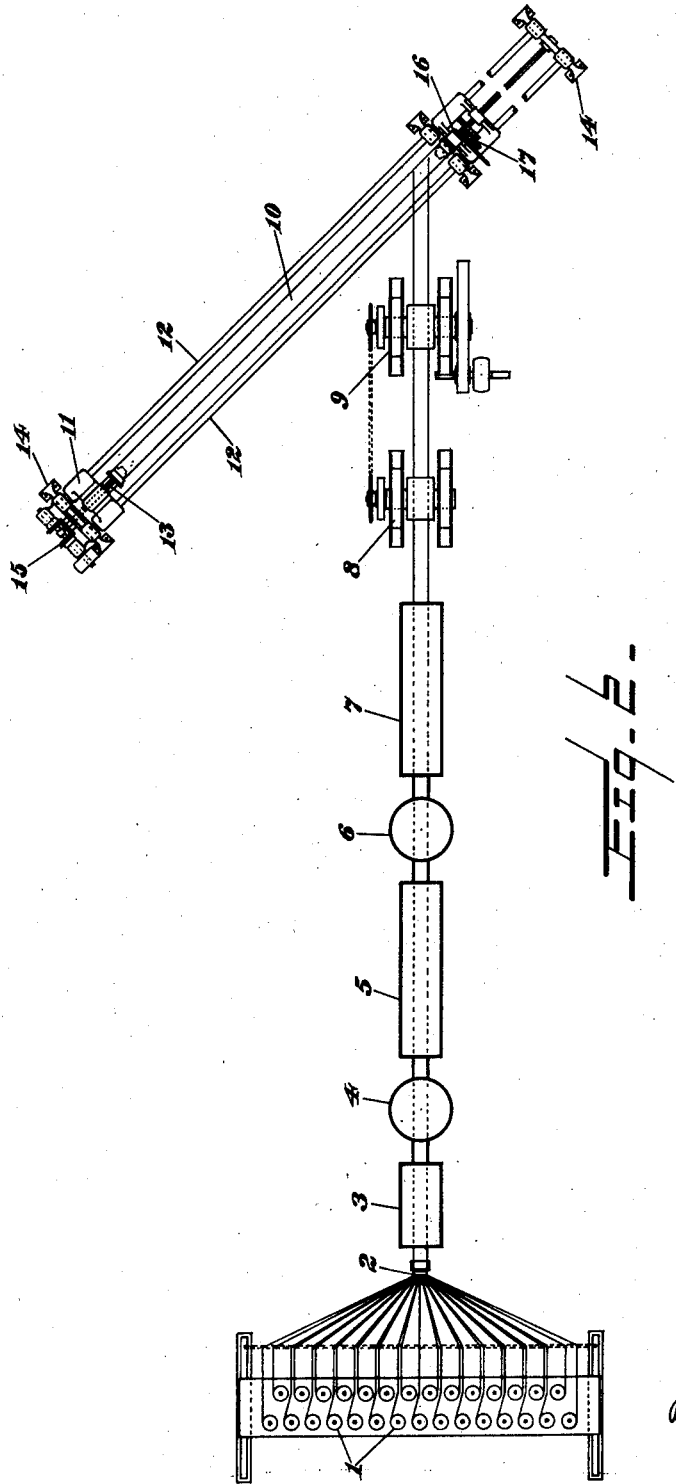

JOSEPH HERBERT COFFEY AND JOSEPH HERBERT COFFEY, JR., OF TORONTO, ONTARIO, CANADA.

PROCESS OF FORMING TUBULAR CORD FABRICS.

1,339,103.  Specification of Letters Patent.  Patented May 4, 1920.

Application filed June 7, 1918. Serial No. 238,682.

*To all whom it may concern:*

Be it known that we, JOSEPH HERBERT COFFEY and JOSEPH HERBERT COFFEY, Junior, of the city of Toronto, in the county of York, Province of Ontario, Canada, have invented a certain new and useful Improved Process of Forming Tubular Cord Fabrics, of which the following is a specification.

The common practice in the manufacture of tire covers, hose and the like is to employ a plurality of plies of bias cut textile fabric suitably superimposed. Each ply must either be made of several separate pieces joined up end to end, or else very large, and therefore expensive, machines must be installed for cutting and coating. There is also at the present time an increasing tendency in tires to substitute cords for the woven fabric, but good cord tires are expensive and the cheaper so-called cord tires are subject to the same disadvantages as are outlined above.

In the present invention our object is to devise means for forming plies of rubber coated cord fabric in such a way that the plies may be made in any length and for tires, hose, or the like, of any size and the bias effect obtained without the use of cutters, calenders and the like of large dimensions, and more particularly to enable cord tire fabrics to be built up by the use of very inexpensive mechanism.

We attain our object by carrying out a series of steps and by the use of the apparatus hereinafter described and illustrated in the accompanying drawings in which—

Figure 1 is a diagrammatical side view, and

Fig. 2 a diagrammatical plan view of the apparatus employed.

In the drawings like numerals of reference indicate corresponding parts in the different figures.

The fabric we employ preferably comprises a plurality of parallel cords. preferably without weft threads of any kind, though a sufficient number of weft threads to act as cross ties might be employed as is common in the art. If cords entirely without weft threads are employed, we preferably draw the cords from spools 1 carried on a spool rack, whence the cords pass through a spacer 2, which brings them into exact parallelism, and thence through a drying chamber 3 heated by steam coils or otherwise. All the moisture is thoroughly dried out of the cords in this chamber, and they are then led into a cement tank 4 through a suitable narrow aperture.

This cement tank contains a rubber cement in which the proportion of solvent to rubber is quite high so that the cement possesses low viscosity. This solution very readily penetrates and impregnates the fibers of the cords.

Through a suitable aperture the cords pass from the cement tank to a suitably heated chamber 5 in which the solvent of the cement is evaporated. The evaporated solvent may be led off if desired and condensed for re-use.

From this chamber 5 the cords pass through a narrow aperture into a second cement tank 6, which contains a cement in which the rubber bears a larger ratio to the solvent, so that the cement is of higher viscosity. This produces a surface coating of cement which adheres perfectly to the cords owing to their previous impregnation with the lighter cement and provides a surface admirably adapted to adhere to the rubber coating subsequently applied as hereinafter described.

From this second cement tank the cords pass through a narrow aperture to a second heated chamber 7 in which the solvent is evaporated. This solvent may also be condensed and saved if desired. From the chamber 7 the cords pass through two calenders 8 and 9 which coat both sides of the cord fabric with a thin coating of rubber just sufficient to fill the interstices of the fabric and to give the cords an adhesive coating.

From the calenders the cord fabric passes to the mandrel 10, which is preferably set at an angle of 45° to the length of the cord fabric. This mandrel is rotated and at the same time moved lengthwise so that the cord fabric is spirally wrapped on the mandrel with the edges of the wrappings substantially contacting without overlapping.

Various means might be devised for carrying and moving the mandrel. We show the mandrel as carried by head stocks 11 slidable on the guide rods 12. These head stocks are movable by means of the screw 13 journaled on the end frames 14. This screw is driven by the bevel gearing 15 provided with a reversing clutch 16 so that the screw may be driven in either direction. The mandrel is driven from this screw by means of change speed gearing 17 of any ordinary type such as employed in lathe practice.

The angle of the mandrel to the length of the fabric passing to it being fixed, the rate of rotation of the mandrel and the speed of its lengthwise movement would depend on the width of the cord fabric employed and the diameter of the mandrel. The mandrel must rotate at such a speed that it will make one complete revolution while it is moving lengthwise a distance equal to that of a line crossing the fabric at an angle of 45° to its length. The diameter of the mandrel will vary according to the size of the tire in which it is to be employed, and the length of the fabric wound on the mandrel will be that of the circumference of the tire in which the fabric is employed.

It will be noted that the impregnation, coating and wrapping is a continuous process, wrapping going on at the same time as the preparatory steps, so that the fabric is built up on the mandrel while the coating of the cords is fresh and tacky. It is also of great importance that the cords are constantly in even and substantially unvarying tension from the time they leave the spools until they are wound on the mandrel, and that after being coated with rubber they run directly to the mandrel without having their course deflected by combs or guides in any direction in the plane in which the cords lie. Guide rollers to simultaneously change the direction of all the cords in planes intersecting all the cords at right angles to their length are alone admissible.

After one ply of the cord fabric of the desired length has been wound on the mandrel, the direction of rotation of the mandrel and the direction of its feed are reversed and a second ply is wound on top of the first ply, therefore crossing the cords of the first ply at an angle of 90°. Other plies might be added, reversing the direction of their application each time, though ordinarily two will be sufficient.

The completed fabric is then stripped from the mandrel, preferably by slitting from end to end, and then used in building up a tire on a suitable core, the ends of the tubular fabric being suitably spliced or fitted together.

With this arrangement it is evident that fabric may be built up for tires of any size and any diameter from a cord or other fabric of very small width, and that consequently the width of the various parts of the plant including the calenders may be very small.

While the process is particularly adapted to the building up of tire fabric, it is also well adapted for the manufacture of lengths of hose, the mandrel being the only part requiring change and that only for the purpose of providing the necessary length. It will be understood, of course, that different mechanism may be employed for drying, impregnating and coating the cords or other fabric employed.

In making hose, the specific details of the process require to be slightly varied, and it is necessary either to first place a rubber tube on the mandrel, or rubber may be wound on the mandrel from the calenders, or the cords of the first ply of fabric heavily coated with rubber sufficient to form an inner lining of rubber for the hose.

This fabric may also be used in the manufacture of belting. The tubular fabric is removed from the mandrel, and rolled flat between rollers, thus making a belt of twice the number of plies as the tubular fabric, and finally vulcanized. This same process may be followed, instead of cutting, in forming tire fabric.

To remove the hose or belting from the mandrel, one end of the tube is made air tight, and air pressure is then inserted at the other end, the bias wound cords allowing the tube to expand sufficiently to be easily removed from the mandrel.

What we claim as our invention is:

A process of forming tubular cord fabrics for tire covers and the like which consists in simultaneously carrying on the following operations, (1) forming a narrow band of substantially unconnected parallel spun cords and thereafter maintaining the continuity of the band until the fabric is formed; (2) impregnating the cords with rubber cement and evaporating the solvent; (3) applying to the band sufficient rubber to thinly coat the cords and fill in the interstices between the same; (4) leading the coated band of cords to a substantially cylindrical mandrel having its axis at an angle to the course of the cords and without changing laterally the direction of movement of the cords; and (5) spirally wrapping the coated cords upon the mandrel by rotating the mandrel and moving it lengthwise until a fabric ply of the desired length is produced, and the band being kept continuously under tension throughout the process.

Signed at Toronto, Canada, this 21st day of May, 1918.

JOSEPH HERBERT COFFEY.
JOSEPH HERBERT COFFEY, Junr.